Jan. 10, 1939. P. L. THACHER 2,143,134
GLARE SHIELD
Filed March 10, 1936 2 Sheets-Sheet 1
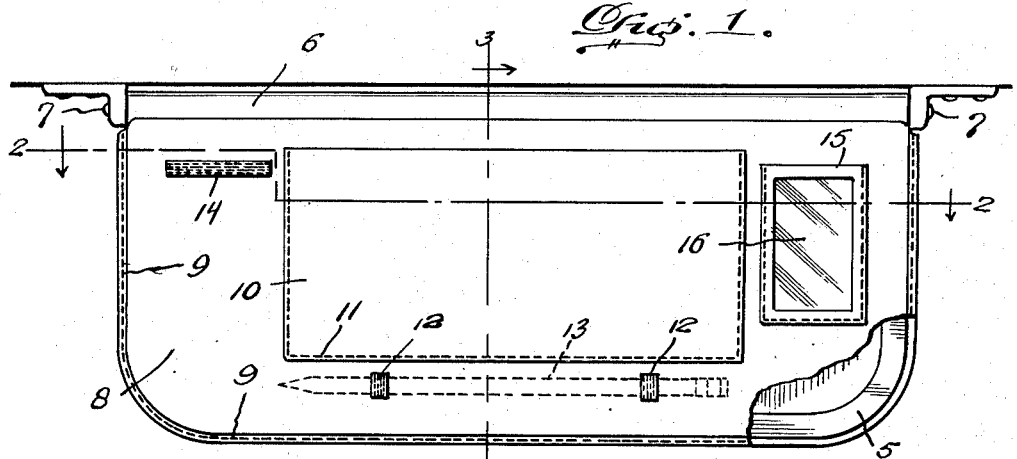
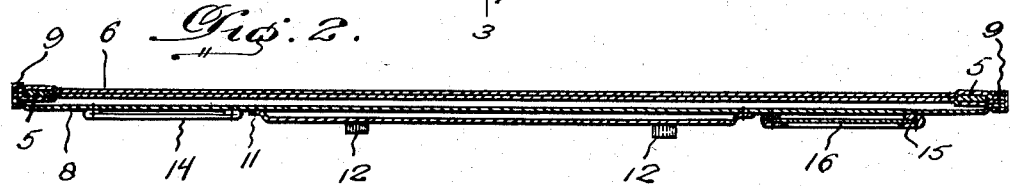
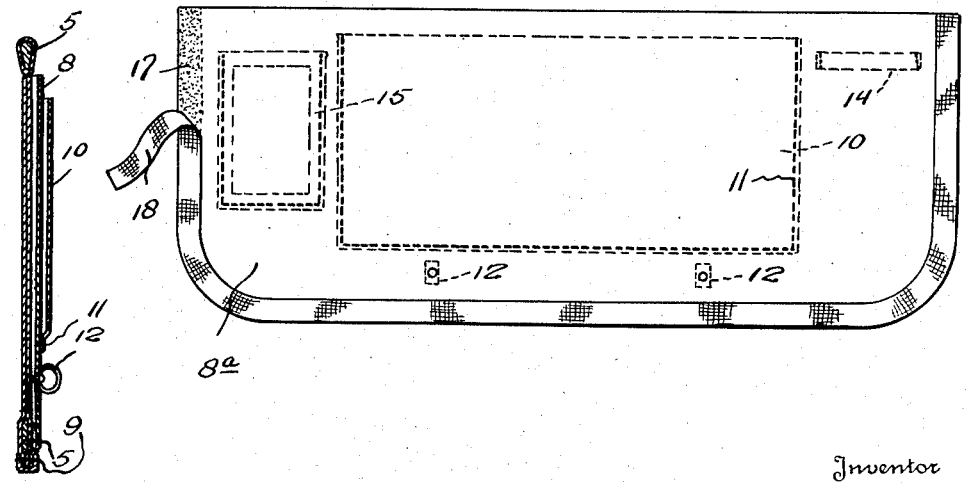
Inventor
Philip L. Thacher,
By J. Stanley Burch
Attorney Jan. 10, 1939.                P. L. THACHER                2,143,134
                               GLARE SHIELD
                        Filed March 10, 1936        2 Sheets-Sheet 2
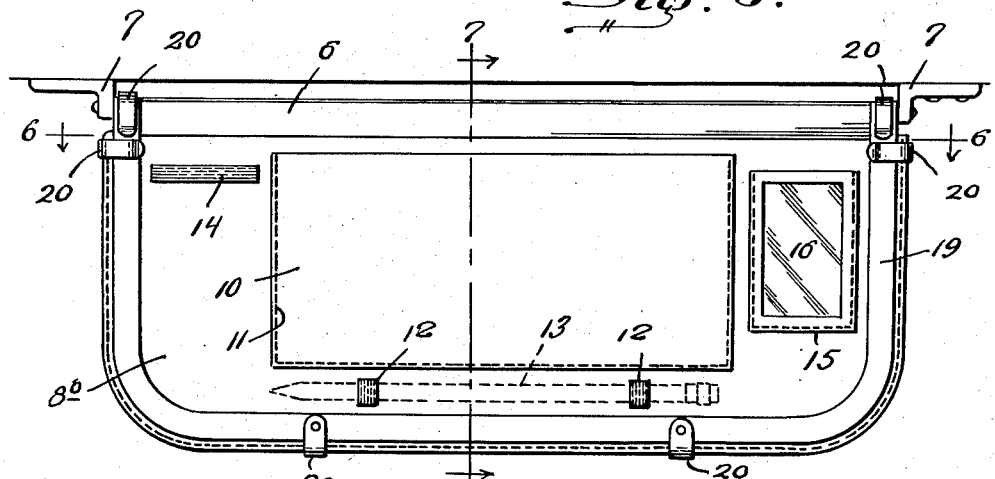
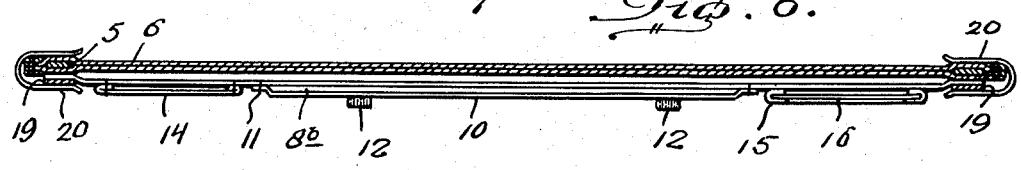
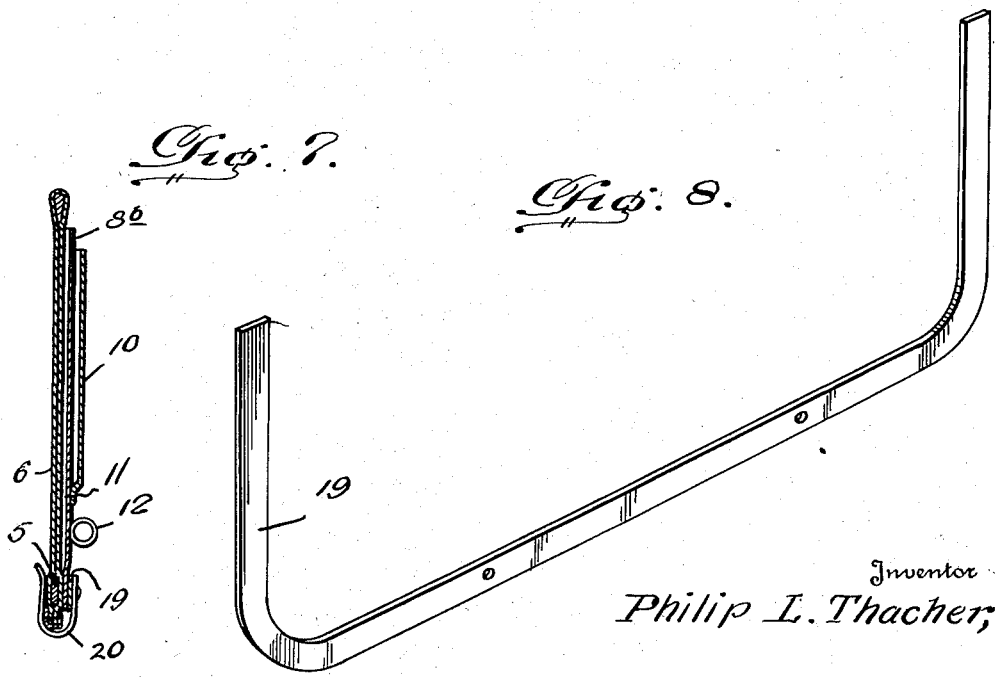
Inventor
Philip L. Thacher;
By J. Stanley Burch
Attorney Patented Jan. 10, 1939

2,143,134

UNITED STATES PATENT OFFICE 2,143,134

GLARE SHIELD

Philip L. Thacher, Topeka, Kans.

Application March 10, 1936, Serial No. 68,126

1 Claim. (Cl. 296—97)

This invention has reference to glare shields of the opaque visor type adapted to be mounted within an automobile with supporting means which permits the shield to be easily and conveniently moved to various positions for intercepting rays of light, particularly sun light. More particularly, the present invention has reference to glare shields of this type embodying a rigid metallic frame having a flexible opaque covering of leather, fabric or the like, the primary object of the present invention being to provide an attachment for a glare shield of this kind whereby such glare shield may be readily provided on its rear or upper side with a pocket for convenient reception of receipts, maps, and other papers and articles pertinent to the automobile.

More particularly, the present invention contemplates the provision of an article-holding attachment for glare shields of the above kind, including a main pocket-forming member in the form of a flexible sheet of leather, fabric, or other suitable material, substantially conforming to the shape and size of the glare shield, and adapted to be secured along its bottom and side edges to the frame covering of the shield proper, so as to provide an open top pocket on the rear or upper surface of said shield suitable for reception of receipts, maps and other papers and articles to which convenient access is desired from the driver's seat of the automobile.

Other objects and features of the present invention will become apparent from the following description when considered in connection with the accompanying drawings, in which:

Figure 1 is a rear elevational view, partly broken away, of a glare shield provided with an article-holding attachment in accordance with the present invention.

Figure 2 is a horizontal section on line 2—2 of Figure 1.

Figure 3 is a vertical section on line 3—3 of Figure 1.

Figure 4 is an inner face view of a modified form of glare shield attachment embodying the present invention.

Figure 5 is a view similar to Figure 1 showing a glare shield provided with another modified form of attachment in accordance with the present invention.

Figure 6 is a section on line 6—6 of Figure 5.

Figure 7 is a section on line 7—7 of Figure 5; and

Figure 8 is a perspective view of the clamping strip employed in Figure 5.

Referring more in detail to the drawings, the glare shield proper may be of any well known or preferred specific construction, but is essentially of the type consisting of a rigid open substantially rectangular frame 5 provided with a flexible opaque covering 6 of leather, fabric or the like, suitable means being provided as generally indicated at 7 to mount the shield within an automobile so that the shield is permitted to be easily and conveniently moved to various positions for intercepting rays of light.

In accordance with the present invention, the glare shield is provided on its rear or upper side with an article-holding attachment including a main member 8 in the form of a sheet of leather, fabric or equivalent flexible material, said member or sheet 8 substantially conforming in shape and size to that of the glare shield, and being secured along its bottom and side marginal edge portions as at 9 to the covering 6 of the glare shield proper adjacent the bottom and side marginal edge portion of said glare shield. In this way, the member or sheet 8 cooperates with the covering 6 to provide a relatively large open-top pocket on the rear or upper surface of the glare shield proper suitable for convenient reception of receipts, maps and other papers and articles pertinent to the automobile in which the glare shield is mounted, such papers and articles being conveniently accessible from the driver's seat of the automobile.

A second smaller pocket may be afforded, if desired, by stitching a second relatively smaller sheet of flexible material 10 to the outer surface of the main sheet 8, the stitching being provided along the bottom and side edges of the sheet 10 as indicated at 11 so as to leave the smaller pocket open at the top. Other desirable article-holding means may be provided on the rear surface of the main sheet 8 below and at opposite sides of the smaller pocket. For instance, suitable spaced elastic bands 12 may be carried by the main sheet 8 for removably holding a pencil on the back of the attachment and at the back of the glare shield directly beneath the bottom of the smaller pocket as indicated by dotted lines at 13. Also, the main sheet 8 may be provided on the back thereof and at one side of the smaller pocket with an elastic note book retaining band 14, and at the other side of the smaller pocket with a card retaining pocket 15 having a transparent window 16 through which the notations on the card may be readily seen without removing the card from such pocket.

While the main member or sheet 8 of the attachment is shown as stitched to the covering 6 of the glare shield, as indicated at 9 in Figures 1 to 3 inclusive, other modes of attachment may be adopted. For instance, the attachment may be made for convenient attachment to glare shields already in use. For this purpose, the main sheet or member indicated at 8a in Figure 4 may be provided along the bottom and side marginal portions of its inner face with cement or other adhesive which is normally slightly sticky, as indicated at 17, which cement or adhesive is normally covered by a removable fabric strip 18. By the use of the strip 18, the cement or adhesive 17 is effectively protected and covered until use of the attachment is desired, whereupon the strip 18 may be removed and the bottom and side marginal portions of the attachment readily applied and secured to the covering of the glare shield.

In the embodiment of Figures 5 to 8 inclusive, the main sheet or member 8b is secured along its side and bottom marginal portions to or against the side and bottom marginal portions of the glare shield, by means of a rigid U-shaped clamping strip 19 and U-shaped clamps or spring clips 20. The clamping strip 19 engages the outer surface of the sheet 8b at the sides and bottom of the latter so as to hold the side and bottom marginal portions of said sheet flatly against the glare shield throughout said marginal portions when the clips 20 are applied over the edges of the glare shield and over the clamping strip at the ends and bottom of the latter.

From the foregoing description, it will be seen that I have provided a useful attachment which may be readily and economically manufactured and placed in use, and which will most effectively supply a great need of automobile drivers. Minor changes and modifications of the details and embodiments of the invention illustrated and described, will suggest themselves to those skilled in the art, without departing from the spirit of the invention as claimed.

What I claim as new is:

An article-holding attachment for glare shields of the visor type embodying an open frame provided with an opaque flexible covering, said attachment comprising a sheet of flexible material substantially conforming to the shape and size of the glare shield and adapted to be secured along its bottom and side marginal edge portions to the bottom and side marginal edge portions of the glare shield to provide an open top pocket on the rear surface of said shield for the reception of papers and articles pertinent to the automobile in which the glare shield is used, and means for securing said sheet of flexible material to the glare shield including a rigid U-shaped clamping strip adapted to engage the outer surface of said sheet at the sides and bottom of the latter, and U-shaped clamps adapted to be applied over the edges of the glare shield and over the clamping strip at the ends and bottom of the latter to cause the clamping strip to hold the side and bottom marginal portions of said sheet flatly against the glare shield throughout said marginal portions.

PHILIP L. THACHER.